(12) United States Patent
Lee

(10) Patent No.: US 11,966,664 B2
(45) Date of Patent: Apr. 23, 2024

(54) TERMINAL AND VEHICLE

(71) Applicants: HYUNDAI MOTOR COMPANY, Seoul (KR); KIA CORPORATION, Seoul (KR)

(72) Inventor: Jae Yong Lee, Chungju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/990,524

(22) Filed: Nov. 18, 2022

(65) Prior Publication Data
US 2023/0185523 A1 Jun. 15, 2023

(30) Foreign Application Priority Data
Dec. 15, 2021 (KR) .................. 10-2021-0179346

(51) Int. Cl.
*B60K 35/10* (2024.01)
*B60K 35/00* (2006.01)
(Continued)

(52) U.S. Cl.
CPC .............. *G06F 3/167* (2013.01); *B60K 35/00* (2013.01); *G10L 15/22* (2013.01); *B60K 35/10* (2024.01);
(Continued)

(58) Field of Classification Search
CPC ... G06F 3/167; B60K 35/00; B60K 2370/148; B60K 2370/152; G10L 15/22
See application file for complete search history.

(56) References Cited

U.S. PATENT DOCUMENTS 8,108,666 B2 * 1/2012 Baskey ............. H04M 1/72448
713/100
9,285,944 B1 * 3/2016 Penilla ................... G06F 3/048
(Continued)

FOREIGN PATENT DOCUMENTS

| DE | 102021101660 A1 * | 7/2022 | ............. B60R 16/02 |
| JP | 4397639 B2 * | 1/2010 | ............. G06F 16/20 |
| KR | 20150043655 A | 4/2015 | |

OTHER PUBLICATIONS

Portable Virtual Vehicle Control and Standard Interface, Jul. 2, 2009, 3 pages (Year: 2009).*

*Primary Examiner* — Yongjia Pan
(74) *Attorney, Agent, or Firm* — Lempia Summerfield Katz LLC

(57) ABSTRACT

A vehicle includes: a display; an electronic device; a control panel including a plurality of items and configured to receive control information for controlling at least one function performed in the electronic device through at least one of the plurality of items; a communicator configured to perform communication with a server; and a processor. The processor is configured to identify a first item having a same function among the plurality of items of the control panel of the vehicle and a plurality of items of a control panel provided in another vehicle, based on manual guide information of the vehicle and manual guide information of the other vehicle received through the communicator. The processor is configured to control the display to display a control panel image of the vehicle and a control panel image of the other vehicle and to display a same emoticon with respect to the identified first item on each of the control panel image of the vehicle and the control panel image of the other vehicle.

17 Claims, 10 Drawing Sheets

(51) Int. Cl.
  *G06F 3/16*       (2006.01)
  *G10L 15/22*      (2006.01)
  *B60K 35/22*      (2024.01)

(52) U.S. Cl.
  CPC ........ *B60K 35/22* (2024.01); *B60K 2360/148* (2024.01)

(56) References Cited

U.S. PATENT DOCUMENTS

| | | | | |
|---|---|---|---|---|
| 9,467,515 | B1* | 10/2016 | Penilla | G09G 5/14 |
| 9,758,116 | B2* | 9/2017 | Xiong | B60R 16/037 |
| 9,851,882 | B2* | 12/2017 | Dai | G06F 3/04883 |
| 10,081,368 | B1* | 9/2018 | Lowry | B60W 50/08 |
| 11,511,703 | B2* | 11/2022 | Wunsche, III | B60H 1/00657 |
| 2002/0120455 | A1* | 8/2002 | Nakata | G06F 3/167 |
| | | | | 704/E15.04 |
| 2007/0207789 | A1* | 9/2007 | Zellner | H04M 3/4931 |
| | | | | 455/415 |
| 2007/0208861 | A1* | 9/2007 | Zellner | G06Q 90/00 |
| | | | | 709/227 |
| 2012/0179325 | A1* | 7/2012 | Faenger | B60K 35/00 |
| | | | | 701/31.4 |
| 2015/0197205 | A1* | 7/2015 | Xiong | B60R 16/037 |
| | | | | 701/49 |
| 2022/0024460 | A1* | 1/2022 | Preuss | B60W 40/08 |

\* cited by examiner

TERMINAL AND VEHICLE

CROSS-REFERENCE TO RELATED APPLICATION

This application is based on and claims priority under 35 U.S.C. § 119 to Korean Patent Application No. 10-2021-0179346, filed on Dec. 15, 2021 in the Korean Intellectual Property Office, the entire disclosure of which is incorporated herein by reference.

BACKGROUND

1. Technical Field

The disclosure relates to a terminal and a vehicle guiding an item that may be operated by a user or guiding a position for operating at least one item.

2. Background Art

A vehicle is equipped with driving devices for driving as well as additional devices for user convenience. Such devices may be a radio device, an audio device, a video device, a route guide device (i.e., a navigation device), an air conditioning device, a seat heating device, an external photographing device (i.e., a dashboard camera), a communication device for communicating with an external user terminal, and the like. A vehicle may further include operation devices for operating functions of various electronic devices.

However, a position and an operation method of the operation devices for operating various electronic devices provided in a vehicle vary for each vehicle manufacturer, vehicle type, and vehicle model. Accordingly, when a user uses a new vehicle, the user may have a hard time operating functions of various electronic devices.

For example, a position, i.e., location or orientation, and an operation method of a fuel tank button or a trunk opening button vary depending on a vehicle manufacturer, vehicle type, and vehicle model. Thus, a user is required to familiarize himself/herself with a user manual (an instruction manual) to use a new car. When a user is unfamiliar with how to use a new vehicle or devices provided with or connected to a new vehicle, the user may have difficulty operating the functions of various electronic devices of the new vehicle. Furthermore, a user is incapable of checking a user manual while driving.

SUMMARY

An aspect of the disclosure provides a terminal and a vehicle that may output manual guide information about an item selected by a user, and that may match and output manual guide information about items of two vehicles.

Additional aspects of the disclosure have been set forth in part in the description that follows and, in part, should be apparent from the description or may be learned by practice of the disclosure.

According to an aspect of the disclosure, a vehicle includes: a display; an electronic device; a control panel including a plurality of items and configured to receive control information for controlling at least one function performed in the electronic device through at least one of the plurality of items; a communicator configured to perform communication with a server; and a processor. The processor is configured to identify a first item having a same function among the plurality of items of the control panel of the vehicle and a plurality of items of a control panel provided in another vehicle, based on manual guide information of the vehicle and manual guide information of the other vehicle received through the communicator. The processor is further configured to control the display to display a control panel image of the vehicle and a control panel image of the other vehicle, and to display a same emoticon with respect to the identified first item on each of the control panel image of the vehicle and the control panel image of the other vehicle.

According to an aspect, the vehicle further includes a memory configured to store manual guide information about the control panel of the vehicle.

According to an aspect, the processor is configured to identify a first item image of the first item in the control panel image of the vehicle, control the display to display the emoticon by being superimposed on the identified first item image, identify a second item image of the first item in the control panel image of the other vehicle, and control the display to display the emoticon by being superimposed on the identified second item image.

According to an aspect, the processor is configured to identify a second item, which does not exist in the control panel of the other vehicle among the plurality of items of the control panel of the vehicle, identify a third item image of the second item, and control the display to display an emoticon, which is different from the emoticon, by being superimposed on the third item image.

According to an aspect, the processor is configured to convert keywords in the manual guide information of the other vehicle into standard keywords, respectively, and to compare standard keywords for the vehicle with the standard keywords for the other vehicle to identify an item having a same function.

According to an aspect, the vehicle further includes a sound receiver configured to receive a sound. The processor is configured to recognize a speech from the received sound, acquire an item based on the recognized speech, and control the display to display manual guide information about the acquired item.

According to an aspect, the vehicle further includes a sound outputter. The processor is configured to control the sound outputter to output the manual guide information about the acquired item by voice.

According to an aspect, the processor is configured to control the display to display an emoticon corresponding to the acquired item on the control panel image of the vehicle, and to display an emoticon corresponding to the acquired item on the control panel image of the other vehicle.

According to another aspect of the disclosure, a terminal includes: an inputter configured to receive a user input; a display; a communicator configured to perform communication with a server; and a processor. The processor is configured to identify a first item having a same function among a plurality of items of a first vehicle and a plurality of items of a second vehicle based on manual guide information of the first vehicle and manual guide information of the second vehicle received through the communicator. The processor is further configured to identify a second item, which does not exist in the second vehicle, among the plurality of items of the first vehicle and to control the display to display a first emoticon for the first item and a second emoticon for the second item on a control panel image of the first vehicle and display the first emoticon for the first item on a control panel image of the second vehicle.

According to another aspect, the first emoticon displayed on the control panel image of the first vehicle is identical to the first emoticon displayed on the control panel image of the second vehicle, and the first emoticon is different from the second emoticon.

According to another aspect, the communicator is configured to perform communication with the first vehicle and receive the manual guide information of the first vehicle from the first vehicle.

According to another aspect, the processor is configured to: identify a first item image of the first item in the control panel image of the first vehicle and a third item image of an additional item in the control panel image of the first vehicle; control the display to display the first emoticon by being superimposed on the identified first item image and display the second emoticon by being superimposed on a third item image; identify a second item image of the first item in the control panel image of the second vehicle; and control the display to display the first emoticon by being superimposed on the identified second item image.

According to another aspect, the processor is configured to: convert keywords in the manual guide information of the second vehicle into standard keywords, respectively; convert keywords in the manual guide information of the first vehicle into the standard keywords, respectively; and compare the standard keywords for the first vehicle with the standard keywords for the second vehicle to identify an item having a same function.

According to another aspect, the terminal further includes a sound receiver configured to receive a sound. The processor is configured to recognize a speech from the received sound, acquire an item based on the recognized speech, and to control the display to display manual guide information about the acquired item.

According to another aspect, the terminal further includes a sound outputter. The processor is configured to control the sound outputter to output the manual guide information about the acquired item by voice.

According to another aspect, the processor is configured to control the display to display an emoticon corresponding to the acquired item on the control panel image of the first vehicle, and to display an emoticon corresponding to the acquired item on the control panel image of the second vehicle.

According to another aspect, the processor is configured to control the display to divide a display area of the display and to display the control panel image of the first vehicle and the control panel image of the second vehicle in each of the divided display areas.

According to another aspect, the processor is configured to transmit, to the server, vehicle information about the first vehicle and vehicle information about the second vehicle received by the inputter.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
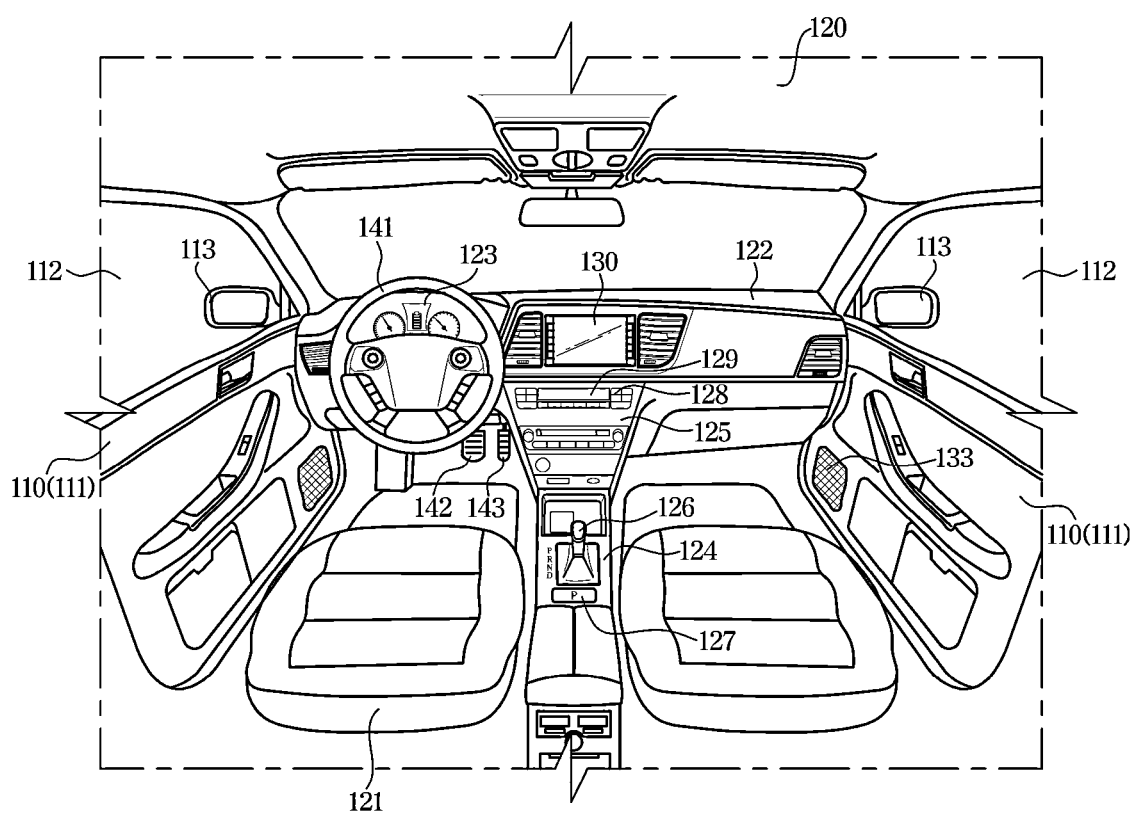
FIG. 1 illustrates an example of an interior of a first vehicle according to an embodiment.

Like reference numerals throughout the specification denote like elements. Also, this specification does not describe all the elements according to embodiments of the disclosure, and descriptions of aspects or elements well-known in the art to which the disclosure pertains or overlapped portions have been omitted. The terms such as "~part," "~member," "~module," "~block," and the like may refer to at least one process processed by at least one hardware or software. According to embodiments, a plurality of "~parts," "~members," "~modules," "~blocks" may be embodied as a single element, or a single of a "~part," "~member," "~module," "~block" may include a plurality of elements.

It should be understood that when an element is referred to as being "connected" to another element, it can be directly or indirectly connected to the other element, wherein the indirect connection includes "connection" via a wireless communication network.

It should be understood that the term "include" and variations thereof, when used in this specification, specifies the presence of stated features, integers, steps, operations, elements, and/or components, but does not preclude the presence or addition of at least one other features, integers, steps, operations, elements, components, and/or groups thereof. When a component, device, element, or the like of the present disclosure is described as having a purpose or performing an operation, function, or the like, the component, device, or element should be considered herein as being "configured to" meet that purpose or to perform that operation or function.

It should be understood that, although the terms first, second, and the like may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced.

Hereinafter, an operation principle and embodiments should be described in detail with reference to the accompanying drawings.

FIG. 1 illustrates an example of an interior of a first vehicle according to an embodiment.

A first vehicle 1 (or a "vehicle") includes a body having an exterior 110 and an interior 120, and a chassis. Mechanical devices for driving the vehicle 1 are mounted to the body as is known.

The exterior 110 of the vehicle body includes a front panel, a bonnet, a roof panel, a rear panel, a plurality of doors 111, and window glass 112 provided to each of the doors 111 to be able to be opened and closed.

The exterior 110 of the body includes a lamp or lamps (not shown) for allowing a driver to easily see surrounding information while keeping an eye toward the front of the vehicle 1 and the road. The lamp or lamps may also function as a signal or a communication method with respect to another vehicle and pedestrians. The exterior of the body further includes a pillar provided at a boundary between the window glass and the door, and side mirrors 113 for providing the driver with a rear view of the vehicle 1.

The exterior 110 of the body further includes an antenna (not shown) for receiving a signal of a global positioning system (GPS) satellite, a broadcasting station, and the like. The antenna may also perform or aid vehicle to everything (V2X) communication such as a vehicle to vehicle (V2V), a vehicle to infrastructure (V2I), and the like.

As shown in FIG. 1, the interior 120 of the vehicle body includes a seat 121 provided for an occupant to sit on, a dashboard 122, an instrument panel (i.e., a duster 123), a center fascia 124 on which an air vent of an air conditioner, and the like, is disposed. The interior 120 of the vehicle body further includes a head unit 125 and an ignition button. The instrument panel 123 is provided on the dashboard 122 and includes a tachometer, speedometer, coolant thermometer, fuel gauge, turn indicator, high beam indicator, warning light, seat belt warning light, odometer, shift lever indicator, door open warning light, engine oil warning light, low oil warning light, and the like. The head unit 125 is provided in the center fascia 124 and receives an operation command for an audio device and the air conditioner. Furthermore, the ignition button is provided in the center fascia 124 and receives an input of a start command.

The seat 121 refers to a chair provided for an occupant to sit comfortably inside the vehicle 1, and may be divided into a driver's seat, a passenger's seat, and a rear seat according to its position.

A seat adjustment lever (not shown) may be provided in the vehicle 1. A distance to the dashboard 122 based on a position of the dashboard 122 may be adjusted in response to an operation of the seat adjustment lever. Furthermore, a height and backrest angle of the seat 121 may be adjusted.

A gear shift lever 126 and a hand brake (or a parking brake button) 127 may be provided in the vehicle 1, and a space for placing objects such as a cup may be provided.

The vehicle 1 may further include a control panel 128 for receiving an operation command of various functions.

The control panel 128 may be provided in at least one of the head unit 125, the center fascia 124, or a steering wheel 141.

The control panel 128 may include a hardware device such as various buttons or switches, a pedal, a keyboard, a mouse, a track-ball, various levers, a handle, a stick, and the like. The various buttons may be physical buttons, including touch-type electronic buttons.

The physical button may include an on/off button of various electronic devices and a button for changing control information about at least one function performed in the various electronic devices.

For example, the physical button may include a wind direction button for selecting a direction of wind (e.g., air) discharged from the air conditioner, an air volume button for selecting an air volume, an indoor temperature selection button for selecting a desired indoor temperature inside the vehicle 1 and an on/off button of a seat heating wire, and a seat temperature selection button. The physical button may further include a radio channel selection button, a radio volume button, and the like.

The control panel 128 may include a jog dial (not shown) for inputting a cursor movement command, a selection command, and the like, of a cursor displayed on a display of a terminal 130 for the vehicle 1. The control panel 128 may also include a graphical user interface (GUI) such as a touch pad, i.e., a software device. The touch pad may be implemented as a touch screen panel (TSP) and form a mutual layer structure with a display panel 129.

The jog dial or touch pad may be provided in the center fascia 124, and the like.

The vehicle 1 may further include the display panel 129 that displays function identification information about a function being performed in the vehicle 1 and input information (e.g., control information) input by the user.

The display panel 129 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and the like, without being limited thereto.

The vehicle 1 further includes the terminal 130 for user convenience. The terminal 130 may be provided in the vehicle 1 for an interface with the user. Hereinafter, the terminal 130 is described as a vehicle terminal 130 to distinguish the vehicle terminal 130 from a user terminal.

The vehicle terminal 130 displays at least one function selected by the user from an audio function, video function, navigation function, broadcasting function (DMB function), radio function, content playback function, and Internet search function. The vehicle terminal 130 also displays manual guide information.

The vehicle terminal 130 may be embedded in the dashboard 122 or installed on the dashboard 122 to be generally vertically upright or oriented.

Figure 2:
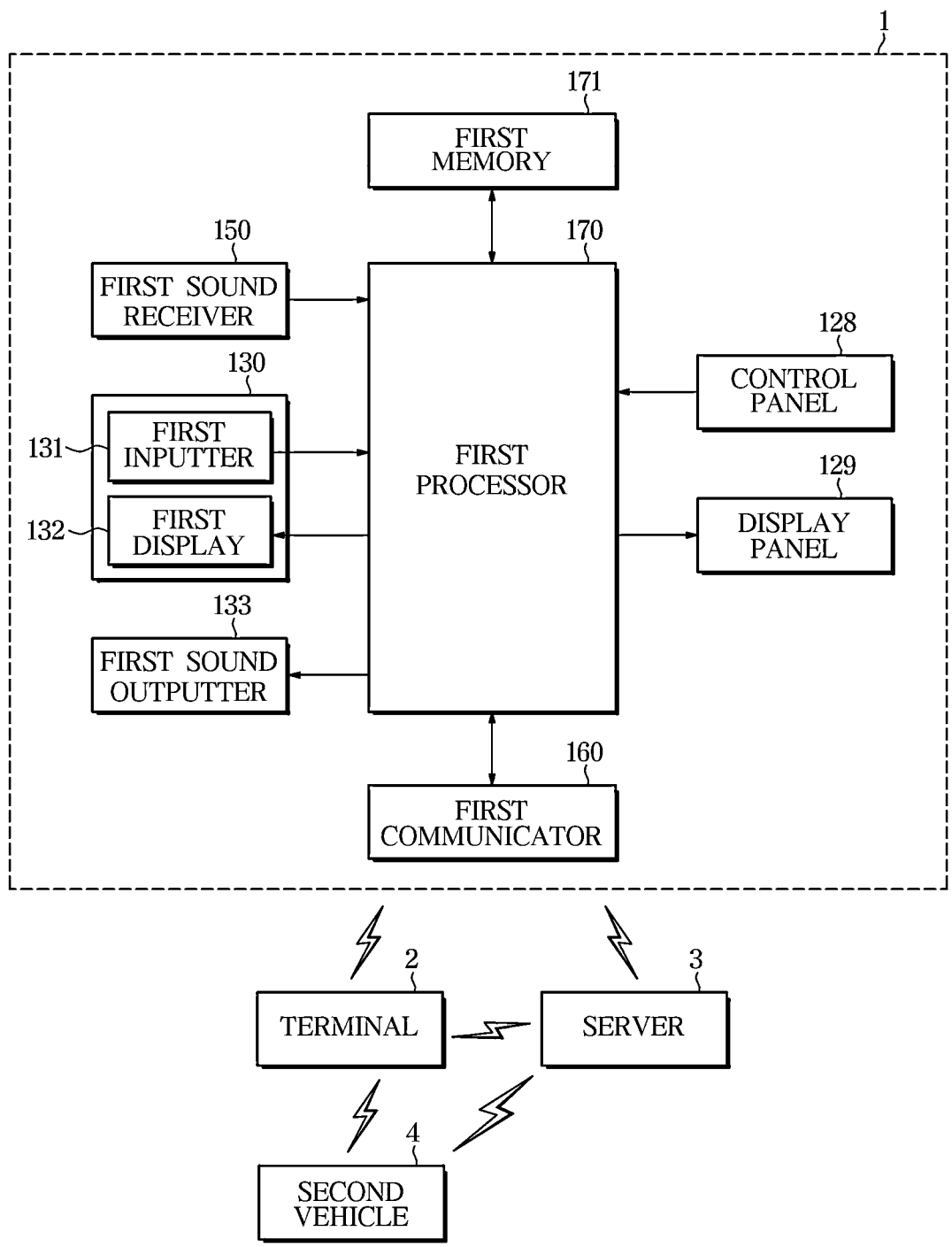
FIG. 2 is a control block diagram illustrating a first vehicle according to an embodiment.

The vehicle terminal 130 may include a display panel as a first display 132 (refer to FIG. 2), and further include a touch panel as a first inputter 131 (refer to FIG. 2).

The vehicle terminal 130 may also include a touch screen where the first display 132 (refer to FIG. 2) and the first inputter 131 (refer to FIG. 2) are integrated.

When the vehicle terminal 130 is implemented as only the first display 132, the vehicle terminal 130 may receive a user input through the control panel 128. When the vehicle terminal 130 is implemented as a touch screen, the vehicle terminal 130 may receive a user input through the touch panel which is the first inputter 131.

The vehicle 1 may further include a sound outputter 133 that outputs operation information about a function being performed in at least one electronic device as a sound.

For example, the function being performed may include the radio function performed in a radio device, the audio function corresponding to the content playback and music reproduction performed in an audio device, the navigation function performed in the vehicle terminal 130, and a manual guide function about the manual guide information.

The sound outputter 133 may include a speaker provided in the vehicle 1, and/or also include a speaker provided in the vehicle terminal 130.

The speaker converts an amplified low-frequency audio signal into original sound waves, generates waves of condensation and rarefaction in the air, and radiates the sound waves, thereby outputting audio data as sound that the user may hear.

The chassis of the vehicle 1 is a frame for supporting the interior body 110 and exterior body 120 of the vehicle 1. The chassis may include a plurality of wheels of the vehicle 1, a power device for applying a driving force to the wheels of the vehicle 1, a steering device, a brake device for applying a braking force to the wheels of the vehicle 1, and a suspension device for adjusting a suspension of the vehicle 1.

The vehicle 1 may include the steering wheel 141 of the steering device for adjusting a driving direction, a brake pedal 142 depressed by the user according to a user's braking intention, and an accelerator pedal 143 depressed by the user according to a user's acceleration intention.

Figure 3:
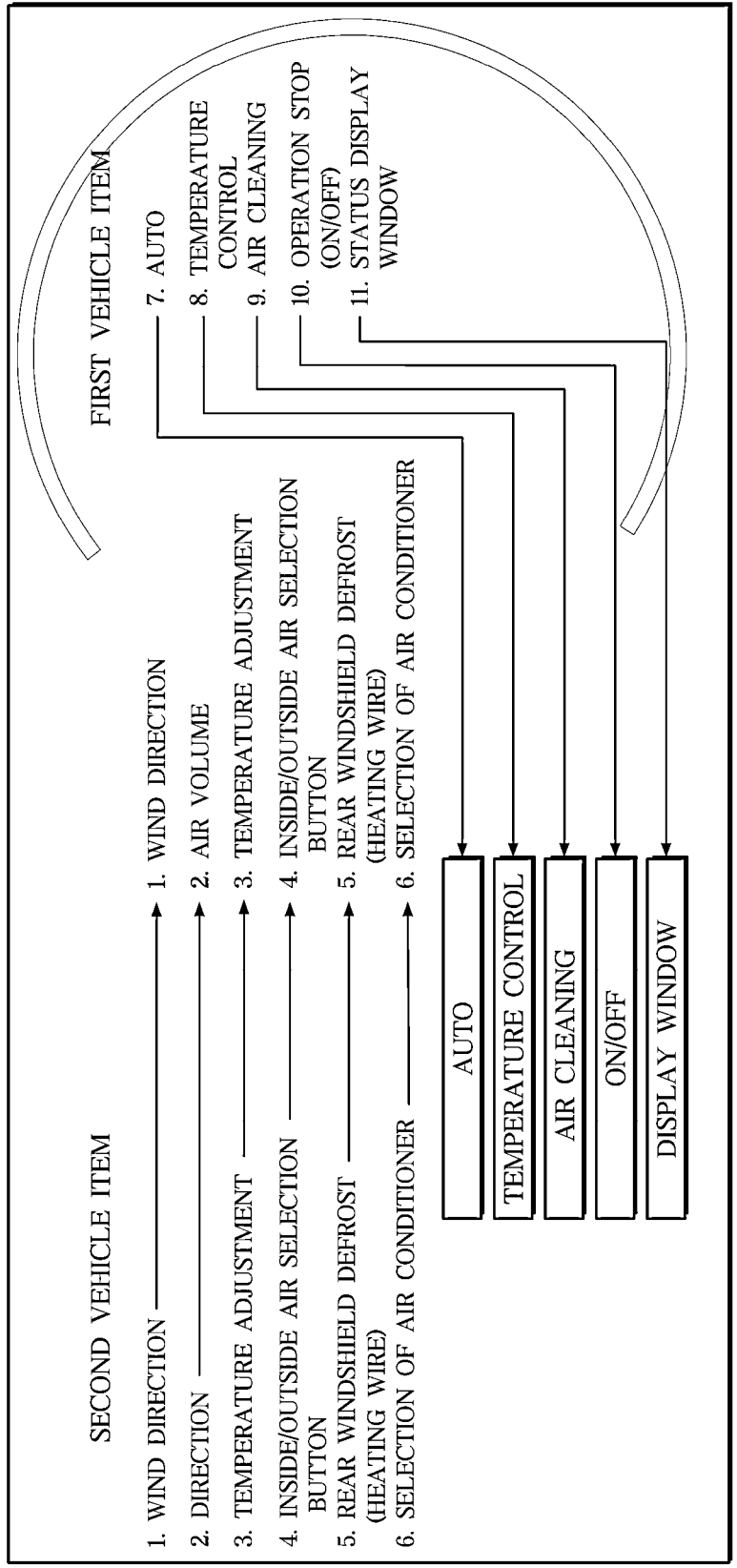
FIG. 3 illustrates an example of matching an item of a first vehicle and an item of a second vehicle according to an embodiment.

FIG. 2 is a control block diagram illustrating a vehicle according to an embodiment. FIGS. 3-5 illustrate examples of displayed images in a vehicle terminal provided in a vehicle according to an embodiment.

The vehicle 1 (or the "first vehicle" 1) includes the control panel 128, the display panel 129, the vehicle terminal 130, the first sound outputter 133, a first sound receiver 150, a first communicator 160, a first processor 170, and a first memory 171.

To distinguish constituent components of the vehicle 1 from constituent components of a user terminal 2, for constituent components with the same name, the constituent components of the vehicle 1 are referred to as 'first' one and the constituent components of the terminal 2 are referred to as 'second' one.

According to the embodiment, the vehicle 1 may be the first vehicle or a rental vehicle. The vehicle 1 may be a new vehicle that a user has purchased. Also, a second vehicle 4 described below may be another vehicle or a vehicle that the user used before changing to the first vehicle.

The control panel 128 receives a user input.

The control panel 128 is for manipulating an operation of at least one electronic device among a plurality of electronic devices provided in the vehicle 1.

Manipulating the operation of electronic devices includes changing control information of one of a plurality of functions of each of the electronic devices. In this instance, the electronic device may execute a function in response to the changed control information.

For example, the plurality of electronic devices may include a driving device such as a brake device, a steering device, and a power device.

Also, the plurality of electronic devices may include a radio device, audio device, video device, route guide device (i.e., navigation device), air conditioner, seat heating wire, external photographing device (i.e., dashboard camera), Hi-pass device, communication device for communicating with an external user terminal (e.g., Bluetooth device), seat adjustment device, side mirror adjustment device, and the like.

The control panel 128 may receive an ON command or OFF command of a manual guide mode for performing a manual guide function and may receive item selection information.

The control panel 128 may include a plurality of lamps provided in each of a plurality of buttons. The lamp provided in the control panel 128 may be turned on in response to an output of manual guide information of an item.

The display panel 129 may display function identification information about a function selected through the control panel 128 or control information of a function.

The display panel 129 may display ON information or OFF information of the manual guide mode.

The vehicle terminal 130 receives a user input and displays function identification information about a function being performed in the vehicle 1 and control information of function. The vehicle terminal 130 may include the first inputter 131 for receiving the user input and the first display 132.

The function identification information may include image information for allowing the user to identify the function being performed in the vehicle 1. For instance, the function identification information may include a wind direction emoticon image about a wind direction of the air conditioner, a temperature emoticon (e.g., text) about a control temperature of the air conditioner, a channel emoticon about channels of the radio device, and a volume emoticon about a volume of the radio device.

The first inputter 131 may receive the ON command or OFF command of the manual guide mode for performing the manual guide function and may receive the item selection information.

The first inputter 131 may also receive destination information or autonomous driving function for performing the navigation function, radio channel information, volume information, and broadcasting channel information.

The first display 132 may display the function identification information about the function being performed in the vehicle 1 or control information of the function.

The first display 132 may display ON information or OFF information of the manual guide mode as an image. The first display 132 may display manual guide information about an item as an image.

The first display 132 may match and display manual guide information of each of the vehicle 1 (the first vehicle) and another vehicle 4 (the second vehicle) for each item.

The first display 132 may match and display a same emoticon with respect to a same item (i.e., a first item).

The items may be a plurality of buttons provided in the control panel.

Each of the items may include function identification information about at least one function performed in each electronic device.

The manual guide information for each item may include manual guide information for each function of each of the electronic devices.

The first sound outputter 133 may output a sound in response to a control command of the first processor 170.

The first sound outputter 133 may output audio data corresponding to the function being performed in the vehicle 1 as a sound. The function being performed in the vehicle 1 may include a radio function performed in the radio device, an audio function corresponding to content playback and music reproduction performed in the audio device, a navigation function performed in the vehicle terminal 130, and a manual guide function about manual guide information.

The first sound outputter 133 may include at least one speaker.

The first sound receiver 150 receives a sound inside the vehicle 1 and transmits sound information about the received sound to the first processor 170. The sound may include a voice.

The first sound receiver 150 may be provided inside the vehicle 1. For example, the first sound receiver 150 may be provided in or around a rear-view mirror, in or around the steering wheel 141, or in or around the cluster 123.

The first sound receiver 150 may include at least one microphone changing a sound wave into an electrical signal. When a plurality of microphones is provided in the vehicle 1, the plurality of microphones may be disposed in various positions inside the vehicle 1.

The first sound receiver 150 may include a microphone array.

The first communicator 160 performs communication with various electronic devices inside the vehicle 1, a server 3 located outside the vehicle 1, the user terminal 2, and a storage medium.

The first communicator 160 may include at least one constituent component enabling communication with the first processor 170, for example, at least one of a short-range communication module, a wired communication module, or a wireless communication module.

The short-range communication module may include a variety of short-range communication modules that transmit and receive signals in a short distance using a wireless communication network. Examples of short-range communication modules include a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a controller area network (CAN) communication module, local area network (LAN) module, wide area network (WAN) module, value added network (VAN) module, and the like. The wired communication module may also include various cable communication modules such as a universal serial bus (USB), high definition multimedia interface (HDMI), digital visual interface (DVI), recommended standard 232 (RS-232), power line communication, plain old telephone service (POTS), and the like.

The wired communication module may further include a local interconnect network (LIN).

The wireless communication module may include wireless communication modules that support a variety of communication methods such as a Wi-Fi module, Wibro module, as well as global system for mobile communication (GSM), code division multiple access (CDMA), wideband CDMA (WCDMA), universal mobile telecommunications system (UMTS), time division multiple access (TDMA), long term evolution (LTE), and the like.

The first communicator 160 may communicate with the server 3 or an infrastructure (not shown) on a road in response to the control command of the first processor 170, and also communicate with the user terminal 2.

The user terminal 2 may be implemented as a computer or a portable terminal that may be connected to the first vehicle 1 or the second vehicle 4 through a network.

For example, the computer may include a laptop with Web Browser, desktop, tablet personal computer (PC), a slate PC, and the like. The portable terminal may be a wireless communication device that guarantees portability and mobility, for example, a personal communication system (PCS), GSM, personal digital cellular (PDC), personal handyphone system (PHS), personal digital assistant (FDA), international mobile telecommunication (IMT)-2000, CDMA-2000, WCDMA, a wireless broadband Internet (Wi-Bro) terminal. The portable terminal may also be all kinds of handheld-based wireless communication devices such as a smartphone, and wearable devices such as a watch, ring, bracelet, anklet, necklace, eyeglasses, contact lenses, or head-mounted-device (HMD), and the like.

The user terminal 2 may perform communication with the first vehicle 1 and the server 3, and transmit, to the first vehicle 1, manual guide information of each of the first vehicle 1 and the second vehicle 4, received from the server 3, in response to a user's request.

The user terminal 2 may receive operation history information of the second vehicle 4 from the second vehicle 4 by performing communication with the second vehicle 4 and may transmit the received operation history information to the server 3.

The user terminal 2 may receive operation history information of the first vehicle 1 from the first vehicle 1 by performing communication with the first vehicle 1 and may transmit the received operation history information to the server 3.

The server 3 may include a cloud server, an edge computer, and the like, and may be at least one of a server providing manual guide information, a telematics server of a vehicle manufacturer, or a server of file hosting service.

The server 3 may store manual guide information of various types of vehicles transmitted from various vehicle manufacturers. The manual guide information may include specification information about electronic devices and a control panel inside a vehicle. The manual guide information may include guide information about operation methods of functions of each of the electronic devices.

The specification information may include information about the configuration and position, and the like, of the electronic devices and control panel.

The server 3 may store user information and information about a vehicle owned by a user.

The user information may include information about a name, an address, an email address, a resident registration number, a date of birth, a driver's license, and the like, of the user registered in the server 3. The user information may further include information about a user terminal.

The information about the user terminal 2 is unique identification information of the terminal 2 distinguished from other terminals. The information about the user terminal 2 includes at least one of a phone number, a Wi-Fi MAC address, a serial number, or international mobile equipment identity (IMEI) of the terminal.

The user terminal 2 may include an application (i.e., an app) for performing a digital key function of the vehicle 1 and an application for transmitting and receiving the manual guide information and operation history information of the vehicle.

The server 3 may provide the first vehicle 1 with manual guide information about the second vehicle 4 requested by the first vehicle 1.

The server 3 may receive operation information of the control panel of the first vehicle 1 from the first vehicle 1. The operation information of the control panel of the first vehicle 1 may include the operation history information.

The server 3 may receive operation information of the control panel of the second vehicle 4 from the second vehicle 4. The operation information of the control panel of the second vehicle 4 may include the operation history information.

The server 3 may transmit the operation information of the second vehicle 4 to the first vehicle 1 in response to a request from the first vehicle 1.

The server 3 may provide the first vehicle 1 with the operation history information of the second vehicle 4 requested by the first vehicle 1. The operation history information of the second vehicle 4 may include operation information about operation through the control panel while the second vehicle 4 is in use. For example, the operation information may include identification information of buttons and information about the number of operations for each button.

The server 3 may perform communication with the user terminal 2 and transmit the manual guide information of the first vehicle 1 and the manual guide information of the second vehicle 4 to the user terminal 2.

The server 3 may receive the operation history information of the first vehicle 1 and the operation history information of the second vehicle 4 from the user terminal 2.

The first processor 170 recognizes a speech from a sound received through the first sound receiver 150, identifies an item selected by the user from the recognized speech, and controls an output of manual guide information about the identified item.

The first processor 170 may control at least one of the first display 132 or the first sound outputter 133 of the terminal to output the manual guide information.

The first processor 170 may further include a speech recognizer for recognizing a speech.

More specifically, the speech recognizer recognizes the speech, converts the speech into a speech in text form, and understand the user's intention by applying a natural language understanding algorithm to the user's speech.

The speech recognizer may collect information related to a state and a driving environment of a vehicle in addition to the speech and may understand a situation using the collected information.

The speech recognizer performs morphological analysis with respect to the speech in text form. A morpheme is a smallest unit of meaning and represents a smallest element of meaning that may not be further segmented. Accordingly, the morphological analysis is performed first to understand a natural language and converts an input character string into a morpheme sequence.

The speech recognizer extracts a domain from the speech based on a result of the morphological analysis. The domain is used to identify a subject of the speech spoken by the user. The domains representing various subjects, such as a manual guide, route guide, weather forecast, searching traffic, schedule management, fuel guide, air-conditioning control, and the like, are databased.

The speech recognizer may recognize an entity name from the speech. The entity name is a proper noun of an electronic device, a function, and the like. An entity name recognition is an operation of identifying an entity name in a sentence and determining a type of the identified entity name. Through the entity name recognition, a meaning of the sentence may be understood by extracting a keyword of the sentence.

The speech recognizer may analyze a speech act of the user's speech. The speech act analysis is for analyzing an intention of a user's speech, such as whether the user's speech intends to ask a question, make a request, make a response, express a feeling, or the like.

The speech recognizer extracts an action corresponding to the intention of the user's speech. The user's speech intention may be identified based on a domain, entity name, and speech act corresponding to the user's speech. Additionally, an action corresponding to the speech intention may be extracted. The action may be defined by an object and an operator.

For example, the action may be an extraction of manual guide information about an item selected by the user through at least one of the first display or the first sound outputter of vehicle terminal.

The speech recognizer may recognize whether the user intends to output the manual guide information, and recognize an item corresponding to the recognized keyword.

The first processor 170 may determine whether the user's speech intends to output manual guide information based on the converted text. When it is determined that the user's speech intends to output the manual guide information, the first processor 170 may identify an item corresponding to the user's speech intention based on the converted text and may identify manual guide information of the first vehicle 1 and manual guide information of the second vehicle 4 corresponding to the identified item. Also, the first processor 170 may control at least one of the first display 132 or the first sound outputter 133 to output the identified manual guide information of each of the first vehicle 1 and the second vehicle 4.

Based on the manual guide information of the second vehicle 4, the first processor 170 may identify an item of the second vehicle 4, classify an electronic device and a function for each identified item, recognize a keyword corresponding to the classified electronic device and function, and change the recognized keyword to a standard keyword.

Based on the manual guide information of the first vehicle, the first processor 170 may identify an item of the first vehicle 1, classify an electronic device and a function for each identified item, recognize a keyword corresponding to the classified electronic device and function, respectively, and change the recognized keywords to standard keywords, respectively. The standard keyword may be a keyword for matching a same item among items of vehicles of different manufacturers, models, and types.

For instance, when a keyword recognized through the manual guide information of the second vehicle 4 is a direction of wind, the direction of wind may be changed to a 'wind direction,' which is a standard keyword.

Also, when a keyword recognized through the manual guide information of the first vehicle 1 is a blowing direction, the blowing direction may be changed to the 'wind direction,' which is the standard keyword.

The first processor 170 may identify item identification information of each of the first vehicle 1 and the second vehicle 4 having the same standard keyword and may match the identified item identification information of each of the first vehicle 1 and the second vehicle 4.

For example, the first processor 170 may identify the 'blowing direction' of the first vehicle 1 and the 'direction of wind' of the second vehicle 4 having the standard keyword of 'wind direction.' The first processor 170 may also recognize the 'blowing direction' of the first vehicle and the 'direction of wind' of the second vehicle 4 as a same item. Further, the first processor 170 may then match and store the 'blowing direction' of the first vehicle 1 and the 'direction of wind' of the second vehicle 4.

The first processor 170 may store identification information of each item of the first vehicle 1 as each standard keyword and may store identification information of each item of the second vehicle 4 as each standard keyword.

As shown in FIG. 3, the first processor 170 may recognize a same item by comparing the standard keyword of the first vehicle 1 and the standard keyword of the second vehicle 4 and may match and store the recognized same item. In this case, the first processor 170 may recognize the same item between the first vehicle 1 and the second vehicle 4 based on a standard keyword for an item of the first vehicle 1 and a standard keyword for an item of the second vehicle 4. The first processor 170 may also match the recognized same item as well as the identification information of the item of the first vehicle and the identification information of the item of the second vehicle 4.

The first processor 170 may control the first display 132 to display a same emoticon for the same item of the first vehicle 1 and the second vehicle 4. The first processor 170 may also control the first sound outputter 133 to output manual guide information about the same item as a sound.

Display images of the first display 132 of the vehicle terminal 130 of the first vehicle 1, in response to a control command of the first processor 170, are described with reference to FIGS. 4A, 4B, 5A, 5B, 6A and 6B.

Figure 4A:
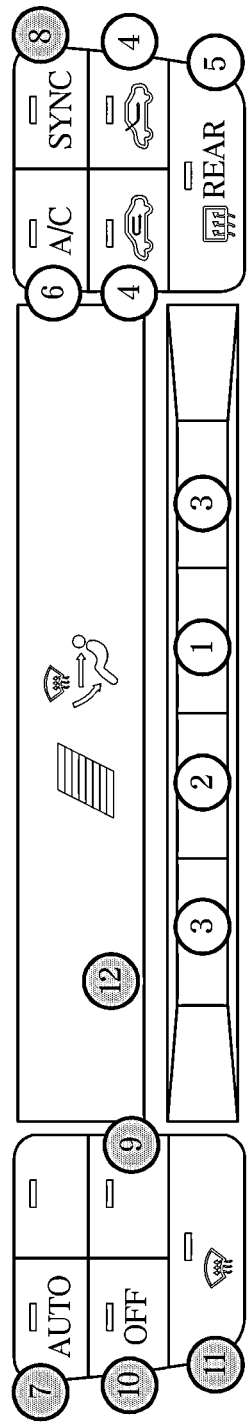
FIG. 4A illustrates a first example of an image of a control panel of a first vehicle displayed on a first display of a terminal of the first vehicle.
Figure 4B:
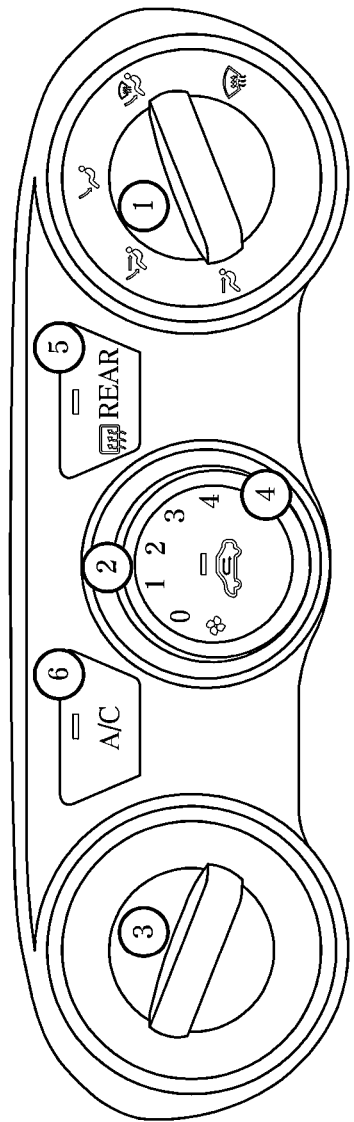
FIG. 4B illustrates a first example of an image of a control panel of a second vehicle displayed on the first display of the terminal of the first vehicle.

FIG. 4A illustrates a first example of an image of a control panel of the first vehicle 1 displayed on the first display 132 of the vehicle terminal 130 of the first vehicle 1. FIG. 4B illustrates a first example of an image of a control panel of the second vehicle 4 displayed on the first display 132 of the vehicle terminal 130 of the first vehicle 1.

The first display 132 of the vehicle terminal 130 of the first vehicle 1 may simultaneously display an image of the control panel of the first vehicle 1 and an image of the control panel of the second vehicle 4.

For example, the first display 132 of the vehicle terminal 130 of the first vehicle 1 may divide a display area of the first display into two display areas which are an upper area and a lower area, display the image of the control panel of the first vehicle 1 in the upper display area, and display the image of the control panel of the second vehicle 4 in the lower display area.

As another example, the first display 132 of the vehicle terminal 130 of the first vehicle 1 may divide a display area of the first display into two display areas which are a left area and a right area, display the image of the control panel of the first vehicle 1 in the left display area, and display the image of the control panel of the second vehicle 4 in the right display area.

As shown in FIG. 4A, the first display 132 of the vehicle terminal 130 of the first vehicle 1 displays the image of the control panel of the first vehicle 1 together with an item image, and also displays an emoticon by superimposing the emoticon on the item image. The item image may include an image of a button for changing control information of a function of at least one electronic device.

As shown in FIG. 4B, the first display 132 of the terminal vehicle 130 of the first vehicle displays the image of the control panel of the second vehicle 4 together with an item image and also displays an emoticon by superimposing the emoticon on the item image.

As shown in FIGS. 4A and 4B, the first display 132 of the terminal vehicle 130 of the first vehicle 1 displays a same first emoticon for a first item having a same function among items of the first vehicle 1 and the second vehicle 4.

For example, the same items of the first vehicle 1 and the second vehicle 4 may include an item for a function of wind direction selection, an item for a function of air volume control, an item for a function of temperature control, an item for a function of inside/outside air selection, an item for a function of rear windshield defrost, and an item for a function of ON/OFF of air-conditioner. In addition, as shown in FIGS. 4A and 4B, ①, ②, ③, ④, ⑤, and ⑥, which are the same emoticons, may be displayed by superimposing each of the same emoticons on each first item image with respect to the first item.

The first display 132 of the vehicle terminal 130 of the first vehicle 1 may display different emoticons for second items, which are different items between the first vehicle 1 and the second vehicle 4.

The second vehicle 4 is a vehicle that is not currently used by the user. The first display 132 of the vehicle terminal 130 of the first vehicle 1 may display a second emoticon for only the second item existing in the first vehicle 1 with respect to the different second items among the items of the first and second vehicles.

In other words, the first display 132 of the vehicle terminal 130 of the first vehicle 1 may display at least one third item image existing in the first vehicle only, not in the second vehicle, and the second emoticon.

For example, the second items existing only in the first vehicle 1 may include an item for a function of automatic selection, an item for a function of same seat temperature control, an item for a function of ON/OFF of air cleaning, an item for an operation stop function, an item for a function of front windshield defrost, and an item for a function of indoor air condition display. In addition, as shown in FIG. 4A, ⑦, ⑧, ⑨, ⑩, ⑪ and ⑫, which are the second emoticons for each second item, may be displayed by superimposing the second emoticons on the third item images with respect to the second items existing in the first vehicle 1 only.

When it is determined that a users speech intends to output manual guide information about one item, the first processor 170 may identify an emoticon for the one item among the items of the first and second vehicles and may control the first display to display the identified emoticon differently from other emoticons.

For example, the first processor 170 may control the first display 132 to differently display a background color, shape, size, text size, text color, text thickness, text style, and the like.

Figure 5A:
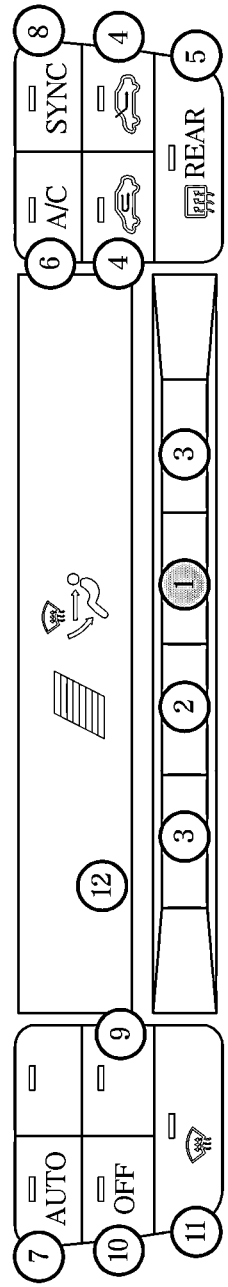
FIG. 5A illustrates a second example of an image of a control panel of a first vehicle displayed on a first display of a terminal of the first vehicle.
Figure 5B:
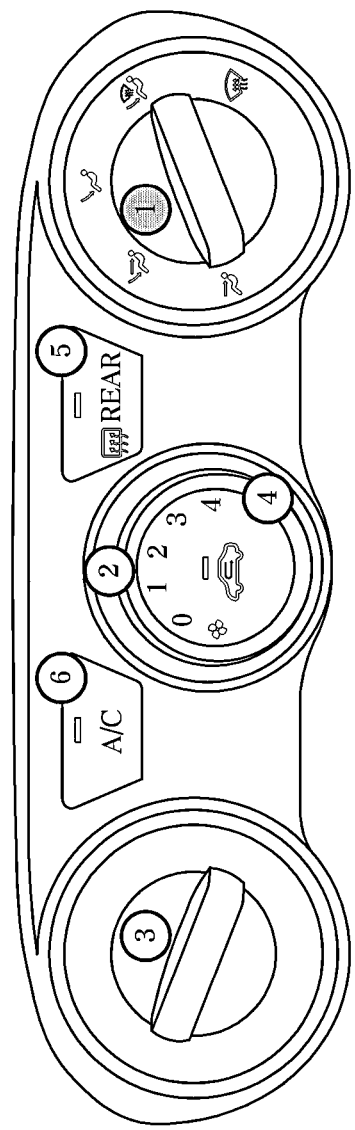
FIG. 5B illustrates a second example of an image of a control panel of a second vehicle displayed on the first display of the terminal of the first vehicle.

FIG. 5A illustrates a second example of an image of a control panel of a first vehicle 1 displayed on the first display 132 of the vehicle terminal 130 of the first vehicle 1, and FIG. 5B illustrates a second example of an image of a control panel of a second vehicle 4 displayed on the first display 132 of the vehicle terminal 130 of the first vehicle 1.

An example is described where it is determined that a user's speech intends to output manual guide information about an item for a function of a wind direction selection.

As shown in FIGS. 5A and 5B, the first display 132 of the vehicle terminal 130 of the first vehicle 1 may display an image of the control panel of the first vehicle 1 together with an emoticon for each item but may also display an emoticon corresponding to the item for the function of the wind direction selection differently from other emoticons. Also, the first display 132 of the vehicle terminal 130 of the first vehicle 1 may display an image of the control panel of the second vehicle 4 together with the emoticon for each item, but may also display the emoticon corresponding to the item for the function of the wind direction selection differently from the other emoticons.

For example, the first display 132 of the vehicle terminal 130 of the first vehicle 1 may display a color of the emoticon corresponding to the item for the function of the wind direction selection, that color being different from the colors of the other emoticons.

The first sound outputter 133 of the first vehicle 1 may output a difference in operation method between the first and second vehicles as a voice.

For example, the first sound outputter 133 may output 'a button ① of the first vehicle performs the same function as knob ① of the second vehicle, and when pressing the button ① of the first vehicle, a wind direction is selected' as voice.

A lamp may be provided in each button provided in the control panel. In this case, the first vehicle 1 may turn on a lamp provided in the button ① on the control panel.

Figure 6A:
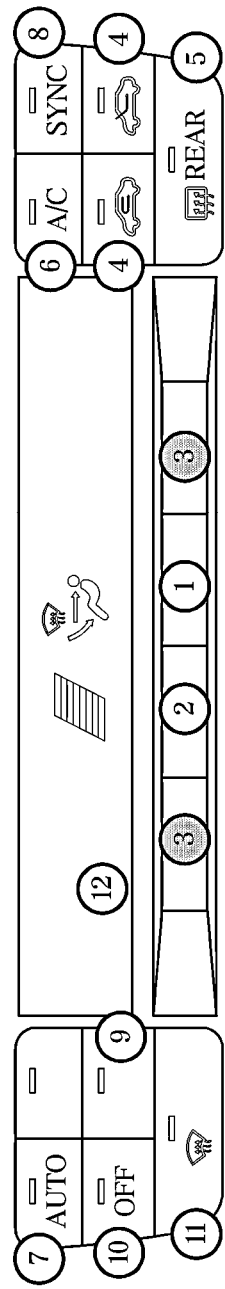
FIG. 6A illustrates a third example of an image of a control panel of a first vehicle displayed on a first display of a terminal of the first vehicle.
Figure 6B:
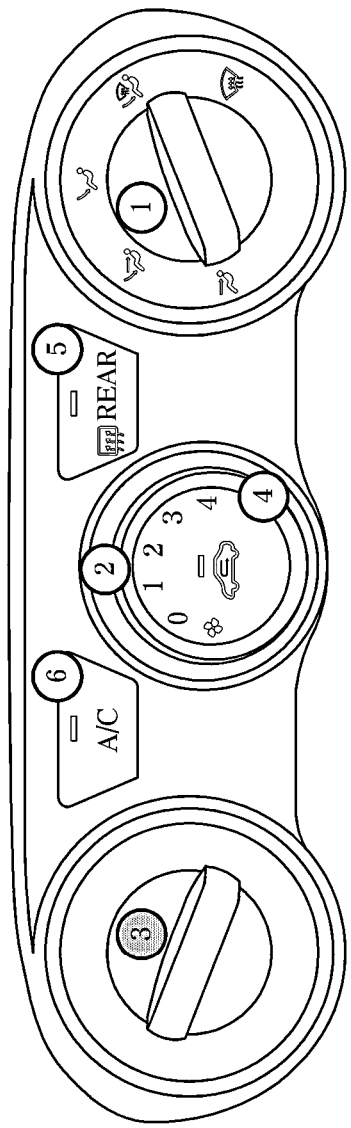
FIG. 6B illustrates a third example of an image of a control panel of a second a vehicle displayed on the first display of the terminal of the first vehicle.

FIG. 6A illustrates a third example of an image of a control panel of a first vehicle 1 displayed on the first display 132 of the vehicle terminal 130 of the first vehicle 1. FIG. 6B illustrates a third example of an image of a control panel of a second vehicle 4 displayed on the first display 132 of the vehicle terminal 130 of the first vehicle 1.

An example is described where it is determined that a user's speech intends to output manual guide information about an item for a function of temperature control.

As shown in FIGS. 6A and 6B, the first display 132 of the vehicle terminal 130 of the first vehicle 1 may display an image of the control panel of the first vehicle 1 together with an emoticon for each item but may also display an emoticon corresponding to the item for the function of the temperature control differently from other emoticons. Also, the first display 132 of the vehicle terminal 130 of the first vehicle 1 may display an image of the control panel of the second vehicle 4 together with the emoticon for each item but may also display the emoticon corresponding to the item for the function of the temperature control differently from the other emoticons.

For example, the first display 132 of the vehicle terminal 130 of the first vehicle 1 may display a color of the emoticon corresponding to the item for the function of the temperature control to be different from colors of the other emoticons.

The first sound outputter 133 of the first vehicle 1 may output, as voice, 'the two buttons ③ of the first vehicle perform the same function as the knob ③ of the second vehicle, and when pressing the two buttons ③ of the first vehicle, a temperature is controlled. In this instance, the left button ③ is for adjusting a temperature of a driver's seat and the right button ③ is for adjusting a temperature of a passenger's seat'.

A lamp may be provided in each button provided in the control panel. In this case, the first vehicle 1 may turn on a lamp provided in the buttons ③ on the control panel.

As described herein, the first processor 170 may control the first display 132 of the terminal to simultaneously output manual guide information of the first vehicle 1 and manual guide information of the second vehicle 4 and to output a same emoticon for an item image of a same item.

The first processor 170 may compare items of the first vehicle 1 with items of the second vehicle 4 and may control at least one of the first display 132 or the first sound outputter 133 to output manual guide information about an item that does not exist in the second vehicle 4 among the items of the first vehicle 1.

The first processor 170 may transmit operation information of the control panel of the first vehicle 1 to the server 3. The first processor 170 may accumulate information about the number of operations and item identification information for each item of the first vehicle 1 and may periodically transmit the item identification information for each item of the first vehicle 1 and the information about the number of operations to the server 3 as well as the user terminal 2.

The first processor 170 may receive operation information of the control panel of the second vehicle 4 through at least one of the server 3 or the user terminal 2.

The first processor 170 may identify an item that has been operated at a rate greater than or equal to a preset rate, based on the operation information of the control panel of the second vehicle 4 and preset reference information. Also, the first processor 170 may identify an item of the first vehicle 1 that is the same as the identified item of the second vehicle 4 among the items of the control panel of the first vehicle 1. The first processor 170 may also control at least one of the first display or the first sound outputter of the terminal to output the identified item of the first vehicle 1 and the identified item of the second vehicle 4.

The first processor 170 may identify an item that has been operated more than a preset number of times, based on the operation information of the control panel of the second vehicle 4 and preset reference information. Also, the first processor 170 may identify an item of the first vehicle 1 that is the same as the identified item of the second vehicle 4 among the items of the control panel of the first vehicle 1. The first processor 170 may also control at least one of the first display or the first sound outputter of the terminal to output the identified item of the first vehicle 1 and the identified item of the second vehicle 4.

The first processor 170 may identify specification information of the control panel of the first vehicle and specification information of the control panel of the second vehicle. The first processor 170 may also identify the identification information of each item on the control panel of the first vehicle 1 and the identification information of each item on the control panel of the second vehicle 4 based on the specification information of the control panel of each of the first vehicle 1 and the second vehicle 4. Also, based on the identification information of each of the items on the control panel of the first vehicle 1 and the identification information of each of the items on the control panel of the second vehicle 4, the first processor 170 may recognize the position information of the items on the control panel of the first and second vehicles, and allow an emoticon to be displayed based on the recognized position information.

The first processor 170 may be implemented as the first memory 171 that stores an algorithm for controlling operations of the constituent components of the vehicle 1 or data about a program that reproduces the algorithm. Furthermore, the first processor 170 may be a processor that performs the herein-described operations using the data stored in the memory. In this instance, the first memory 171 and the first processor 170 may be provided as one chip, or as separate chips.

The first memory 171 stores various data and learning models for speech recognition.

The first memory 171 may store information related to a domain, action, speech act, and entity name used for natural language understanding in advance. Further, the first memory 171 may store a context understanding table used to understand a context from input information. Also, the first memory 171 may store data detected by a sensor provided in the vehicle, user-related information, and information required for performing an action in advance.

The first memory 171 may include a spin-transfer torque database (STT DB) and a domain/action inference rule database (DB). In the domain/action inference rule DB, actions such as manual guide, road guide, vehicle condition check, gas station recommendation, and the like, may be predefined, and an action corresponding to a user's speech, i.e., an action intended by a user, may be extracted from the predefined actions according to the stored inference rule.

The first memory 171 may store operation information of the control panel of the first vehicle.

The first memory 171 may store user information and vehicle information of the first vehicle 1.

The first memory 171 may store a keyword about an electronic device and a function for each item, specification information of the first vehicle 1, and manual guide information of the first vehicle 1.

The first memory 171 may store specification information of the second vehicle 4, manual guide information of the second vehicle 4, and operation information of the control panel of the second vehicle 4.

The first memory 171 may be implemented as at least one of a volatile memory such as a random access memory (RAM), a non-volatile memory such as a cache, a flash memory, a read-only memory (ROM), an erasable programmable read-only memory (EPROM), an electrically erasable programmable read-only memory (EEPROM), or a recording medium such as a hard disk drive (HDD) and a compact disc read-only memory (CD-ROM), without being limited thereto.

At least one constituent component may be added or omitted depending on performances of the constituent components of the vehicle illustrated in FIG. 2. Also, it should be readily understood by those having ordinary skill in the art that positions of the constituent components may be changed according to a performance or configuration of a system.

Further, each of the constituent components illustrated in FIG. 2 refers to a software and/or a hardware, such as field-programmable gate array (FPGA) and an application-specific integrated circuit (ASIC).

Figure 7:
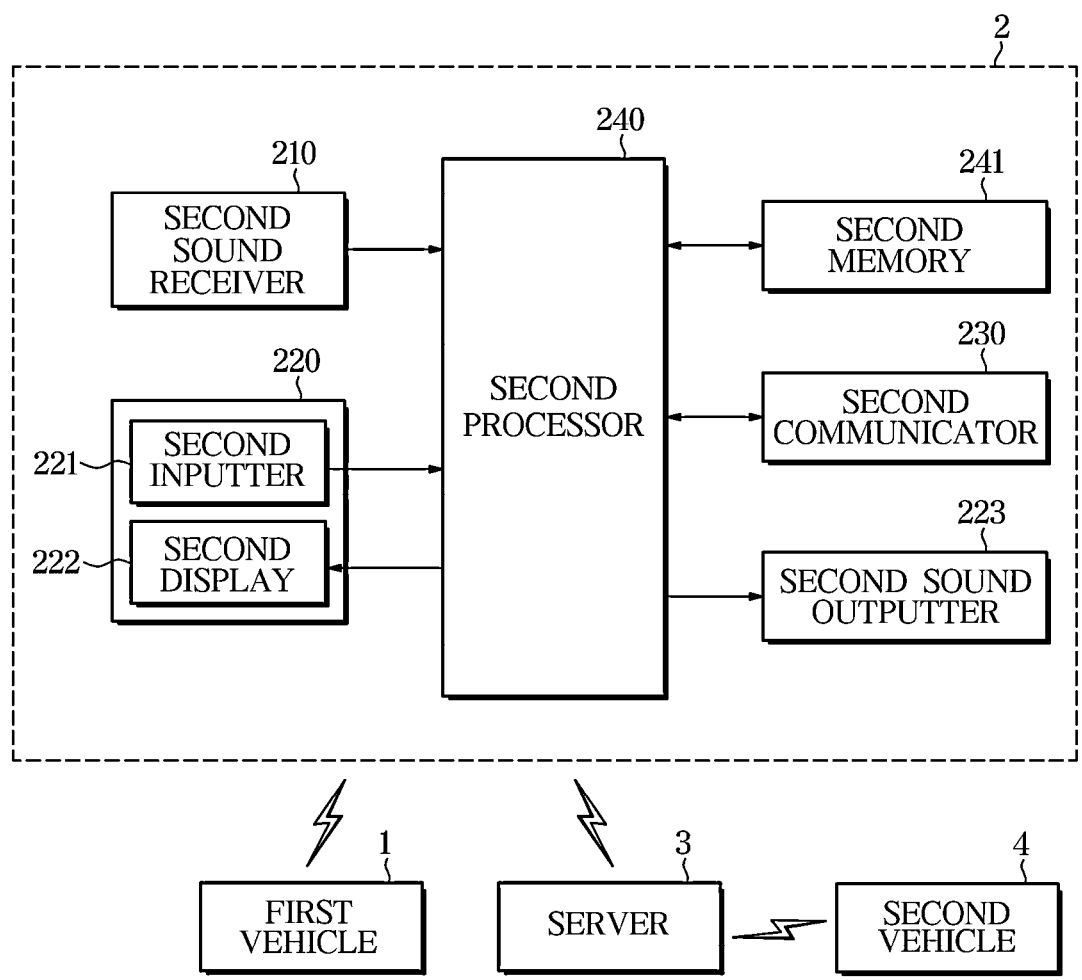
FIG. 7 is a control block diagram illustrating a terminal according to another embodiment.

FIG. 7 is a control block diagram illustrating a terminal according to another embodiment.

The user terminal 2 may be implemented as a computer or a portable terminal capable of connecting to a vehicle through a network.

For example, the computer may include a laptop with web browser, desktop, tablet PC, a slate PC, and the like. The portable terminal may be a wireless communication device that guarantees portability and mobility, for example, a PCS, GSM, PDC, PHS, FDA, IMT-2000, CDMA-2000, WCDMA, and a WiBro terminal. Further, the portable terminal may be all kinds of handheld-based wireless communication devices such as a smartphone, wearable devices such as a watch, ring, bracelet, anklet, necklace, eyeglasses, contact lenses, or HMD, and the like.

The user terminal 2 (or 'terminal') may perform user registration through an application and may receive and store an electronic key (or a digital key) of a first vehicle 1. The electronic key may include control right information of the vehicle. Information about the user terminal 2 and the vehicle may be stored in the electronic key.

For example, the user terminal 2 may change a state of the vehicle doors from a locked state to an unlocked state by remotely controlling a locking member using the stored electronic key. The user terminal 2 may also control operations of various electronic devices provided in the vehicle and starting of the vehicle using the stored electronic key.

The user terminal 2 may include an application (i.e., an app) for performing a digital key function of the vehicle and an application for transmitting and receiving manual guide information and operation history information of the vehicle.

The user terminal 2 may perform communication with the first vehicle 1 and the server 3.

The user terminal 2 includes a second sound receiver 210, a user interface 220, a second sound outputter 223, a second communicator 230, a second processor 240 and a second memory 241.

The second sound receiver 210 receives a sound around the terminal 2. The sound may include a voice.

The second sound receiver 210 may include at least one microphone and a microphone array.

The user interface 220 inputs and outputs various information related to a terminal function.

The user interface 220 may include a second inputter 221 and a second display 222 and may be provided as a touch screen where a touch panel and a display panel are integrated.

The second inputter 221 may receive a user input.

The second inputter 221 may receive vehicle information of the first vehicle 1 and second vehicle 4. The vehicle information may include information about a manufacturer, a type, a model, a model year, and the like, of the vehicle.

The second inputter 221 may receive an ON/OFF command of a manual guide mode.

The second display 222 may display an emoticon and an image of a control panel of each of the first vehicle 1 and the second vehicle 4, Since a display example of the second display 222 has been described herein (refer to FIGS. 4A, 43, 5A, 5B, 6A and 6B), a description thereof has been omitted.

The second sound outputter 223 may output a sound in response to a control command of the second processor 240.

The second sound outputter 223 may output a sound about a manual guide function.

The second communicator 230 performs communication with the first vehicle 1 and the server 3.

The second communicator 230 may receive the vehicle information of the first vehicle 1 from the first vehicle 1.

The second communicator 230 may receive vehicle information of the second vehicle 4 from the server 3 and may also receive the vehicle information of the first vehicle 1.

The second processor 240 recognizes a speech from the sound received through the second sound receiver 210, identifies an item of the first vehicle 1 selected by a user from the recognized speech, and controls an output of manual guide information about the identified item.

The second processor 240 may control at least one of the second display 222 or the second sound outputter 223 to output the manual guide information.

A control configuration of the second processor 240 for controlling the output of the manual guide information has been omitted herein, since it is the same as an embodiment described above.

The second memory 241 may store information the same as the first memory 171. Accordingly, a detailed description of the second memory 241 has been omitted.

At least one constituent component may be added or omitted depending on the performances of the constituent components of the vehicle illustrated in FIG. 7. Also, it should be readily understood by those having ordinary skill in the art that positions of the constituent components may be changed depending on a performance or structure of system.

Further, each of the constituent components illustrated in FIG. 7 refers to a software and/or a hardware such as field-programmable gate array (FPGA) and an application-specific integrated circuit (ASIC).

As is apparent from the above, according to the embodiments of the disclosure, when a user has changed vehicles, the terminal and the vehicle can output first manual guide information for operating functions of various electronic devices provided in a new vehicle (i.e., a first vehicle) together with second manual guide information for operating functions of various electronic devices provided in a familiar vehicle used before the change. Thus, the terminal and the vehicle can improve a user's awareness of operation of the functions of the electronic devices.

According to the embodiments of the disclosure, the terminal and the vehicle can match and output manual guide information of each of a first vehicle 1 and a second vehicle 4 for each item. Thus, the terminal and the vehicle can improve a user's convenience in using various electronic devices of the first vehicle and can allow the user to quickly and efficiently learn how to operate functions of the various electronic devices provided in the changed, i.e., unfamiliar vehicle.

According to the embodiments of the disclosure, the terminal and the vehicle can alleviate the user's inconvenience of having to check a booklet or a plurality of manuals downloaded from a server one by one to check specifications related to how to operate functions of the various electronic devices provided in the changed vehicle.

According to the embodiments of the disclosure, even during driving, the terminal and the vehicle can output manual guide information about an electronic device function required by a user through speech recognition, improving a user's convenience and driving safety.

According to the embodiments of the disclosure, even when a user rents a vehicle, the terminal and the vehicle can output manual guide information corresponding to an item selected by the user, thereby allowing the user to easily operate functions of various electronic devices provided in the rental vehicle and prevent an accident due to inexperienced or unfamiliar operation.

According to the embodiments of the disclosure, the terminal and the vehicle can improve marketability and competitiveness of the vehicle and increase user satisfaction.

Embodiments can thus be implemented through computer readable code/instructions in/on a medium, e.g., a computer-readable medium, to control at least one processing element to implement any herein described embodiments. The medium can correspond to any medium/media permitting the storing and/or transmission of the computer-readable code.

The computer-readable code can be recorded on a medium or transmitted through the Internet. The medium may include read-only memory (ROM), random access memory (RAM), magnetic tapes, magnetic disks, flash memories, and optical recording mediums.

Although embodiments have been described for illustrative purposes, those having ordinary skill in the art should appreciate that various modifications, additions, and substitutions are possible, without departing from the scope and spirit of the disclosure. Therefore, embodiments have not been described for limiting purposes.

What is claimed is:

1. A vehicle comprising:
a display;
an electronic device;
a control panel including a plurality of items and configured to receive control information for controlling at least one function performed in the electronic device through at least one of the plurality of items;
a communicator configured to perform communication with a server; and
a processor configured to
identify a first item having a same function among the plurality of items of the control panel of the vehicle and a plurality of items of a control panel provided in another vehicle, based on manual guide information of the vehicle and manual guide information of the other vehicle received through the communicator,
control the display of the vehicle to display a control panel image of the vehicle and a control panel image of the other vehicle on the display of the vehicle and display a same emoticon with respect to the identified first item on each of the control panel image of the vehicle and the control panel image of the other vehicle displayed on the display of the vehicle,
identify a first item image of the first item in the control panel image of the vehicle,
control the display to display the emoticon by being superimposed on the identified first item image,
identify a second item image of the first item in the control panel image of the other vehicle, and
control the display to display the emoticon by being superimposed on the identified second item image.

2. The vehicle of claim 1, further comprising:
a memory configured to store manual guide information about the control panel of the vehicle.

3. The vehicle of claim 1, wherein the processor is further configured to identify a second item that does not exist in the control panel of the other vehicle among the plurality of items of the control panel of the vehicle, identify a third item image of the second item, and control the display to display a second emoticon for the second item by being superimposed on the third item image.

4. The vehicle of claim 1, wherein the processor is further configured to convert keywords in the manual guide information of the other vehicle into standard keywords, respectively, and compare standard keywords for the vehicle with the standard keywords for the other vehicle to identify an item having a same function.

5. The vehicle of claim 1, further comprising:
a sound receiver configured to receive a sound,
wherein the processor is configured to recognize a speech from the received sound, acquire an item based on the recognized speech, and control the display to display manual guide information about the acquired item.

6. The vehicle of claim 5, further comprising a sound outputter, wherein the processor is configured to control the sound outputter to output the manual guide information about the acquired item by voice.

7. The vehicle of claim 5, wherein the processor is further configured to control the display to display an emoticon corresponding to the acquired item on the control panel image of the vehicle, and an emoticon corresponding to the acquired item on the control panel image of the other vehicle.

8. A terminal comprising:
an inputter configured to receive a user input;
a display;
a communicator configured to perform communication with a server; and
a processor configured to
identify a first item having a same function among a plurality of items of a first vehicle and a plurality of items of a second vehicle based on manual guide information of the first vehicle and manual guide information of the second vehicle received through the communicator,
identify a second item, which does not exist in the second vehicle, among the plurality of items of the first vehicle,
control the display of the first vehicle to display a first emoticon for the first item and a second emoticon for the second item on a control panel image of the first vehicle and display the first emoticon for the first item on a control panel image of the second vehicle on the display of the first vehicle,
identify a first item image of the first item in the control panel image of the first vehicle and a third item image of an additional item in the control panel image of the first vehicle,
control the display to display the first emoticon by being superimposed on the identified first item image and to display the second emoticon by being superimposed on the third item image,
identify a second item image of the first item in the control panel image of the second vehicle, and
control the display to display the first emoticon by being superimposed on the identified second item image.

9. The terminal of claim 8, wherein the first emoticon displayed on the control panel image of the first vehicle is identical to the first emoticon displayed on the control panel image of the second vehicle, and
wherein the first emoticon is different from the second emoticon.

10. The terminal of claim 8, wherein the communicator is further configured to perform communication with the first vehicle and receive the manual guide information of the first vehicle from the first vehicle.

11. The terminal of claim 8, wherein the processor is further configured to:
convert keywords in the manual guide information of the second vehicle into standard keywords, respectively;
convert keywords in the manual guide information of the first vehicle into the standard keywords, respectively; and
compare the standard keywords for the first vehicle with the standard keywords for the second vehicle to identify an item having a same function.

12. The terminal of claim 8, further comprising a sound receiver configured to receive a sound, wherein the processor is configured to recognize a speech from the received sound, acquire an item based on the recognized speech, and control the display to display manual guide information about the acquired item.

13. The terminal of claim 12, further comprising a sound outputter, wherein the processor is configured to control the sound outputter to output the manual guide information about the acquired item by voice.

14. The terminal of claim 13, wherein the processor is further configured to control the display to display an emoticon corresponding to the acquired item on the control panel image of the first vehicle and to display an emoticon corresponding to the acquired item on the control panel image of the second vehicle.

15. The terminal of claim 14, wherein the processor is further configured to control the display to divide a display area of the display and display the control panel image of the first vehicle and the control panel image of the second vehicle in each of the divided display areas.

16. The terminal of claim 8, wherein the processor is further configured to transmit, to the server, vehicle information about the first vehicle and vehicle information about the second vehicle received by the inputter.

17. A vehicle comprising:
a display;
an electronic device;
a control panel including a plurality of items and configured to receive control information for controlling at least one function performed in the electronic device through at least one of the plurality of items;
a communicator configured to perform communication with a server; and
a processor configured to
identify a first item having a same function among the plurality of items of the control panel of the vehicle and a plurality of items of a control panel provided in another vehicle, based on manual guide information of the vehicle and manual guide information of the other vehicle received through the communicator,
control the display of the vehicle to display a control panel image of the vehicle and a control panel image of the other vehicle on the display of the vehicle and display a same emoticon with respect to the identified first item on each of the control panel image of the vehicle and the control panel image of the other vehicle displayed on the display of the vehicle, and
convert keywords in the manual guide information of the other vehicle into standard keywords, respectively, and compare standard keywords for the vehicle with the standard keywords for the other vehicle to identify an item having a same function.

* * * * *